(12) United States Patent
Bernbaum et al.

(10) Patent No.: US 10,265,637 B2
(45) Date of Patent: Apr. 23, 2019

(54) RIDE-ON AND PUSH TOY FOR STORAGE AND PICKING UP SMALL OBJECTS ON PLANE SURFACE

(71) Applicants: Tova Bernbaum, Brooklyn, NY (US); Eliezer Leider, Brooklyn, NY (US)

(72) Inventors: Tova Bernbaum, Brooklyn, NY (US); Eliezer Leider, Brooklyn, NY (US)

(73) Assignee: Eliezer Leider, Brooklyn, NY (US)

( * ) Notice: Subject to any disclaimer, the term of this patent is extended or adjusted under 35 U.S.C. 154(b) by 0 days.

(21) Appl. No.: 15/458,745

(22) Filed: Mar. 14, 2017

(65) Prior Publication Data
US 2018/0264372 A1 Sep. 20, 2018

(51) Int. Cl.
| A63H 33/02 | (2006.01) |
| A63H 33/00 | (2006.01) |
| A63H 17/00 | (2006.01) |
| A47L 25/00 | (2006.01) |
| B62B 7/12  | (2006.01) |
| A63G 19/00 | (2006.01) |
| A63H 3/00  | (2006.01) |

(52) U.S. Cl.
CPC ............ *A63H 33/00* (2013.01); *A47L 25/00* (2013.01); *A63G 19/00* (2013.01); *A63H 3/003* (2013.01); *A63H 3/005* (2013.01); *A63H 17/00* (2013.01); *A63H 33/007* (2013.01); *B62B 7/12* (2013.01)

(58) Field of Classification Search
CPC ........ A63H 33/00; A63H 33/007; A63H 7/02; A63H 17/264; A63H 17/266; A63H 17/36; A63H 7/04

USPC .................................................. 446/450–453
See application file for complete search history.

(56) References Cited

U.S. PATENT DOCUMENTS

| 1,507,317 | A | * | 9/1924 | Laberge | ................. | E01H 1/047 |
| | | | | | | 15/363 |
| 2,287,133 | A | * | 6/1942 | Reiter | ................. | A63B 47/021 |
| | | | | | | 171/85 |
| 3,197,918 | A | * | 8/1965 | Coggeshall | .............. | A63H 7/04 |
| | | | | | | 446/290 |
| 3,240,201 | A | * | 3/1966 | Shelton | ................. | A63H 33/00 |
| | | | | | | 124/17 |
| 3,668,730 | A | * | 6/1972 | Scharmann | ............ | E01H 1/045 |
| | | | | | | 15/83 |
| 3,959,922 | A | * | 6/1976 | Leistikow | ............. | A63H 33/30 |
| | | | | | | 446/144 |
| 3,983,662 | A | * | 10/1976 | Hart | ...................... | A63H 33/30 |
| | | | | | | 446/237 |
| 4,031,659 | A | * | 6/1977 | Keller | .................... | A63H 17/05 |
| | | | | | | 446/427 |
| 4,140,325 | A | * | 2/1979 | Tucker | ................... | A63G 19/00 |
| | | | | | | 198/515 |
| 4,262,443 | A | * | 4/1981 | Ferris | .................... | A63H 13/02 |
| | | | | | | 446/289 |
| 4,282,622 | A | * | 8/1981 | Rosendall | ............... | A47L 11/33 |
| | | | | | | 15/41.1 |

(Continued)

*Primary Examiner* — Gene Kim
*Assistant Examiner* — Matthew B Stanczak

(57) ABSTRACT

A ride-on, wheeled toy picks up small objects from a plane surface. The ride-on toy can be driven by the feet of a child sitting on the toy or by the hands of a person standing behind the toy. The pick-up mechanism of the toy is a continuous gear and belt system with flexible sweeping fins. The pick-up mechanism can be activated or deactivated by a push button or switch.

1 Claim, 52 Drawing Sheets

(56) References Cited

U.S. PATENT DOCUMENTS

| | | | | |
|---|---|---|---|---|
| 4,295,294 A * | 10/1981 | Rosenwinkel | A63H 33/32 | 446/144 |
| 4,917,648 A * | 4/1990 | Hartje | A63H 17/05 | 446/424 |
| 4,966,400 A * | 10/1990 | Hull | E01H 1/006 | 15/79.1 |
| 5,294,153 A * | 3/1994 | Nolan | A63H 17/26 | 280/827 |
| 5,378,191 A * | 1/1995 | Ryaa | A63H 33/305 | 446/144 |
| 5,474,483 A * | 12/1995 | Sun | A63H 3/005 | 280/33.998 |
| 5,920,939 A * | 7/1999 | Worwag | A46B 13/001 | 15/41.1 |
| 6,446,981 B1 * | 9/2002 | Wise | B62B 3/007 | 280/30 |
| 6,524,161 B1 * | 2/2003 | Asami | A63H 3/006 | 446/140 |
| 6,968,587 B2 * | 11/2005 | Grey | A46B 13/001 | 15/377 |
| 7,117,556 B2 * | 10/2006 | Grey | A47L 11/32 | 15/41.1 |
| 7,143,461 B2 * | 12/2006 | Spooner | A47L 11/33 | 15/41.1 |
| 7,967,317 B2 * | 6/2011 | Ewringmann | B62K 9/00 | 15/48.1 |
| 8,186,009 B2 * | 5/2012 | Smith | A47L 9/0427 | 15/390 |
| 8,201,863 B1 * | 6/2012 | Konovalov | E01H 1/006 | 15/79.1 |
| 8,858,290 B2 * | 10/2014 | Clark | A63H 33/007 | 446/238 |
| 2004/0034952 A1 * | 2/2004 | Ho | A47L 11/22 | 15/48.1 |

* cited by examiner

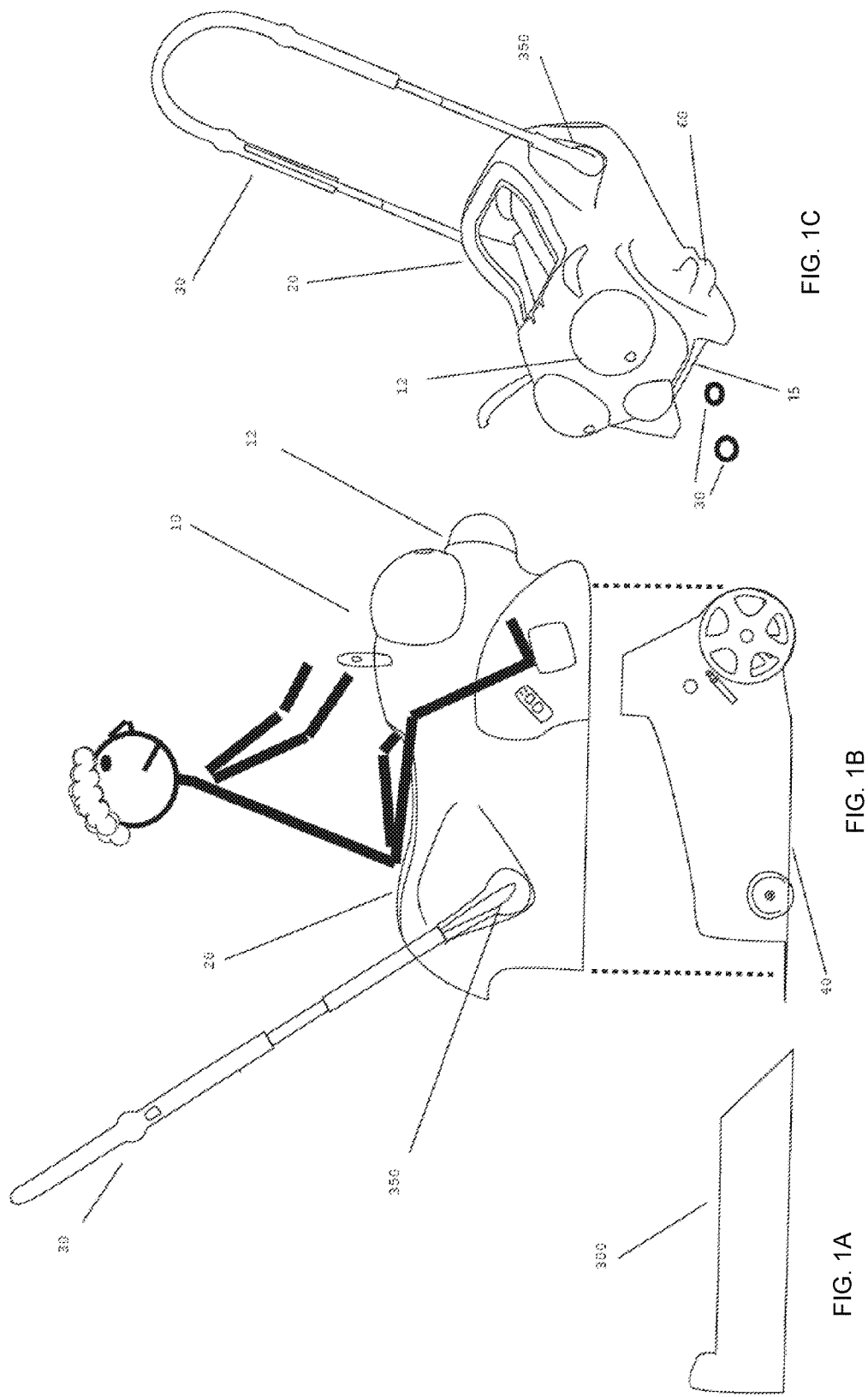

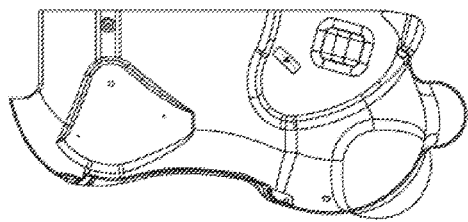
FIG. 2C
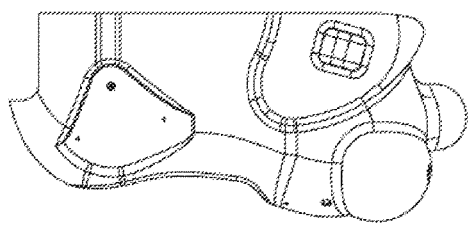
FIG. 2B
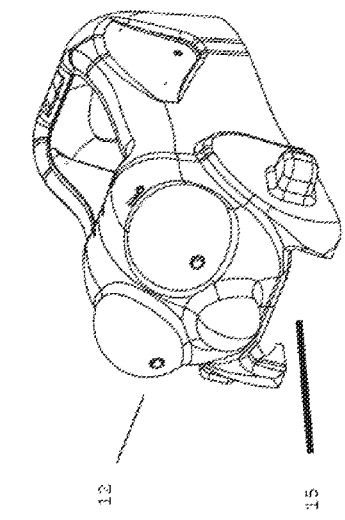
FIG. 2E
FIG. 2
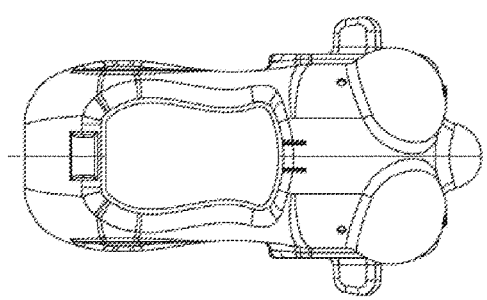
FIG. 2A
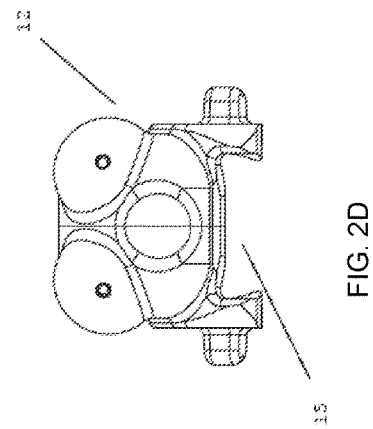
FIG. 2D

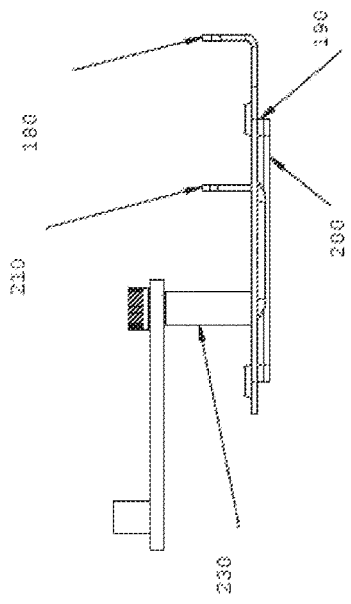
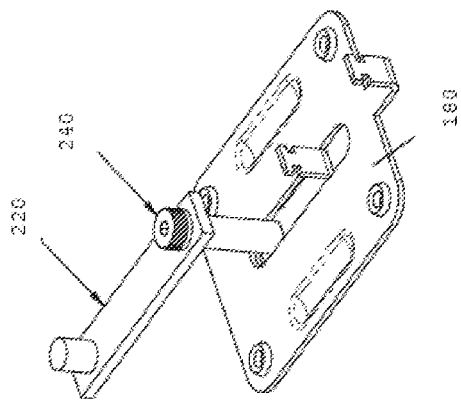
FIG. 7B
FIG. 7A
FIG. 7

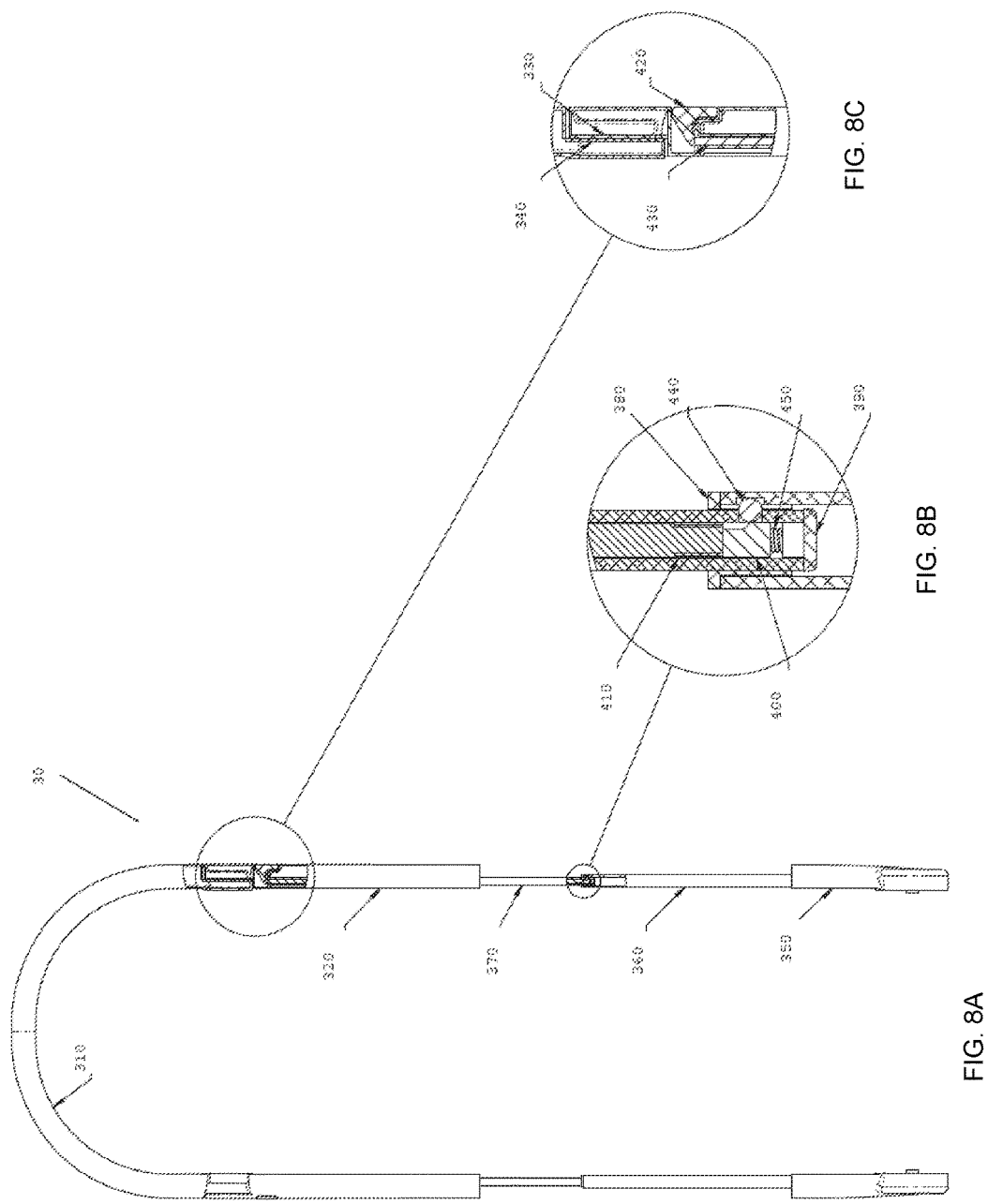

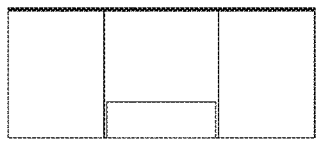
FIG. 9B
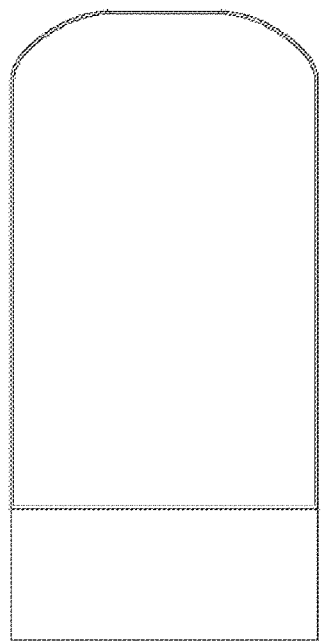
FIG. 9A
FIG. 9C
FIG. 9

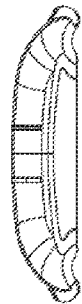
FIG. 10C
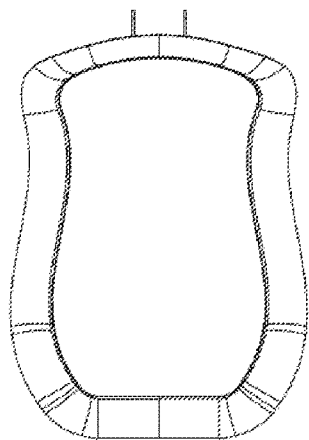
FIG. 10A
FIG. 10B
FIG. 10

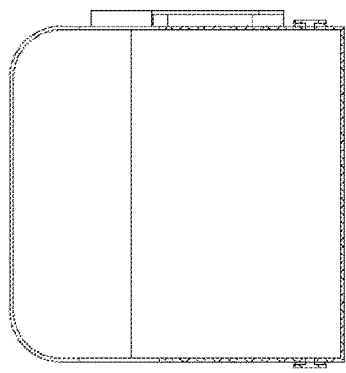
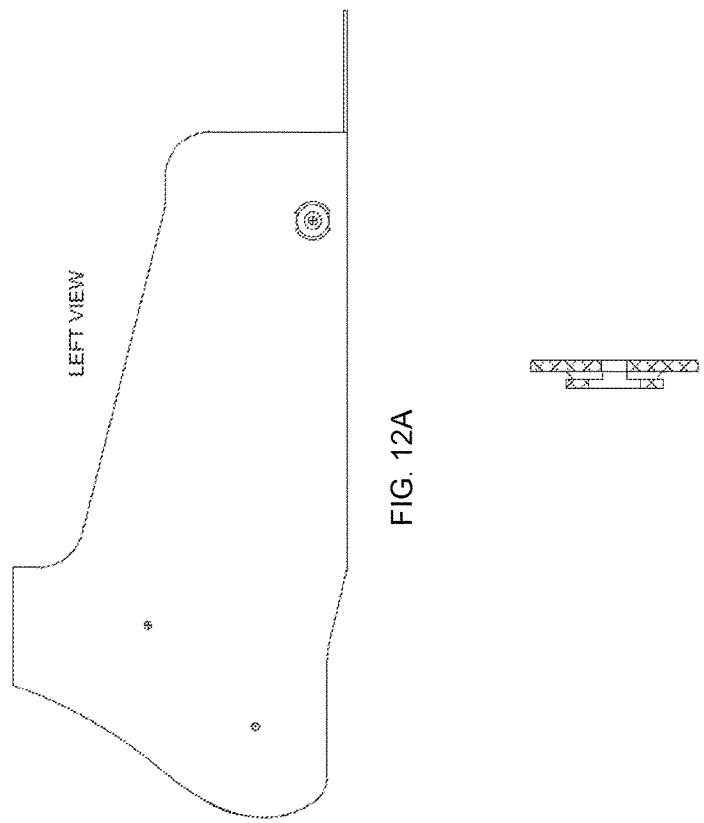
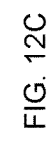
FIG. 12B
FIG. 12
LEFT VIEW
FIG. 12A
FIG. 12C

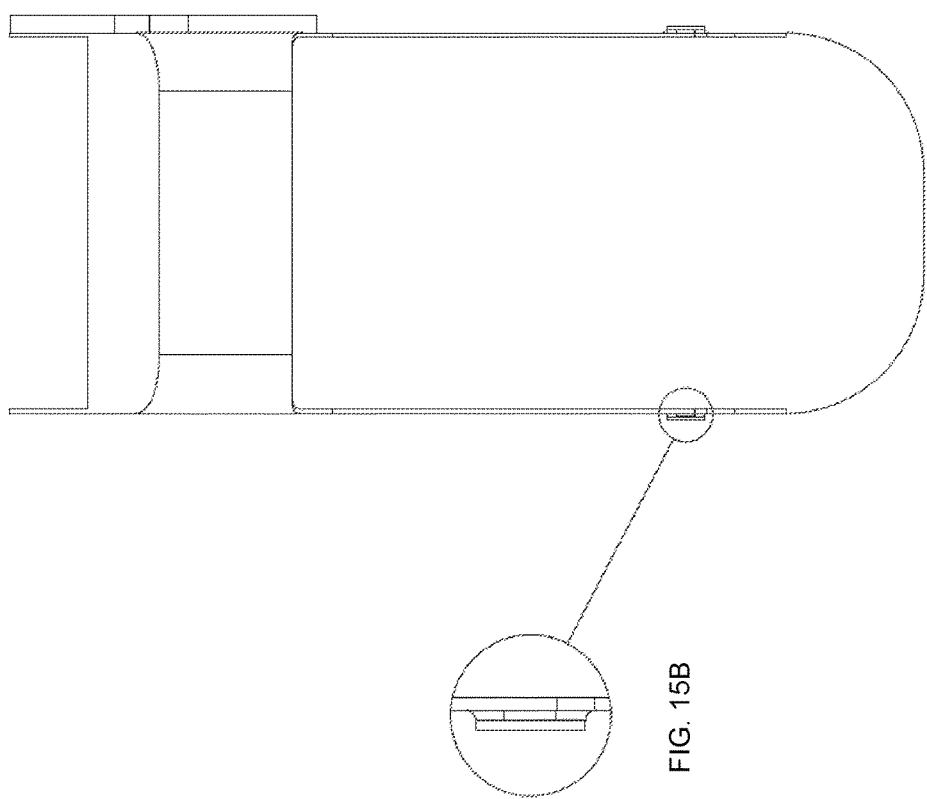

FIG. 16C
FIG. 16B
FIG. 16A
FIG. 16

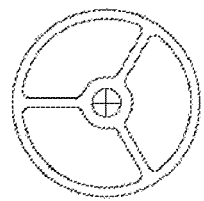
FIG. 17B
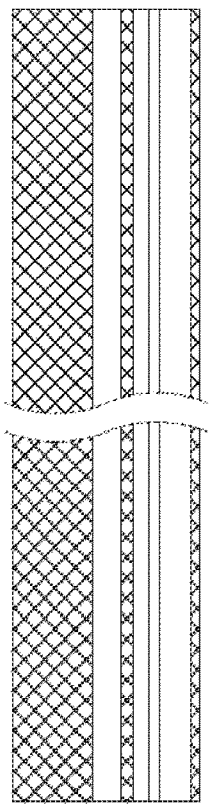
FIG. 17A
FIG. 17

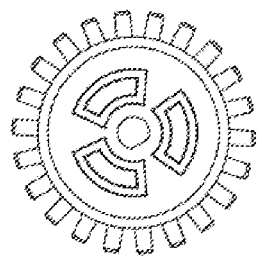
FIG. 18C
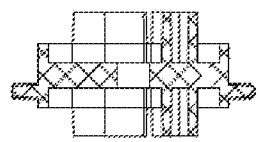
FIG. 18B
FIG. 18
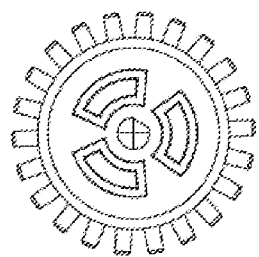
FIG. 18A

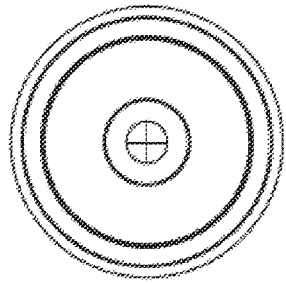
FIG. 19C
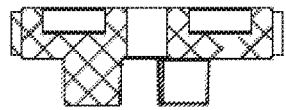
FIG. 19B
FIG. 19
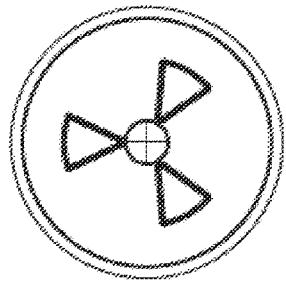
FIG. 19A

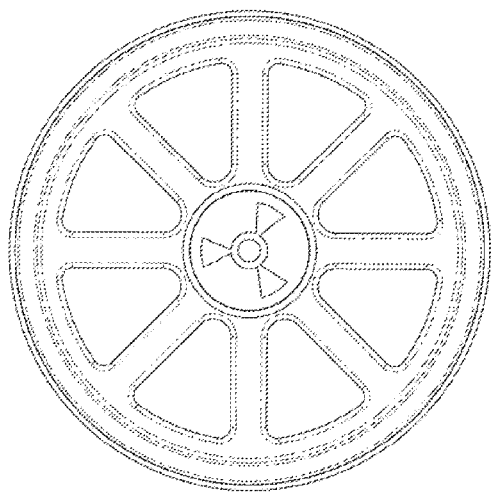
FIG. 20C
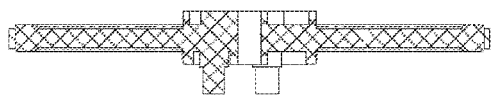
FIG. 20B
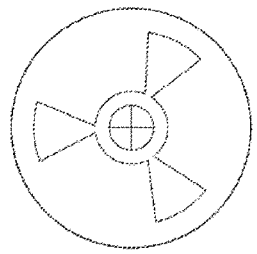
FIG. 20E
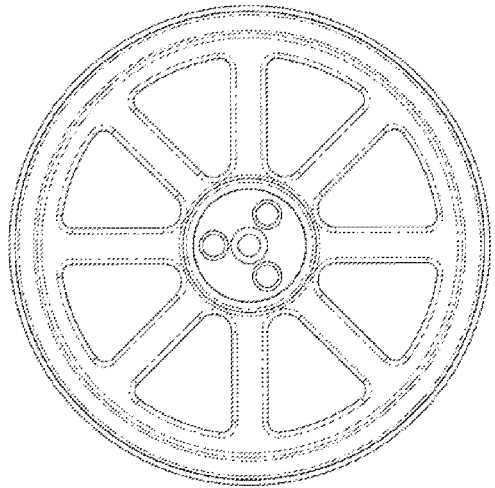
FIG. 20A
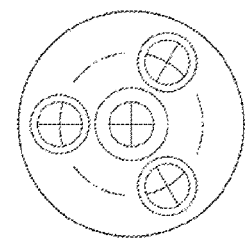
FIG. 20D
FIG. 20

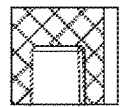
FIG. 21B
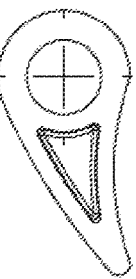
FIG. 21A
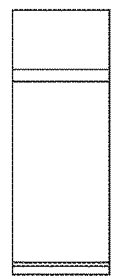
FIG. 21C
FIG. 21

FIG. 22B
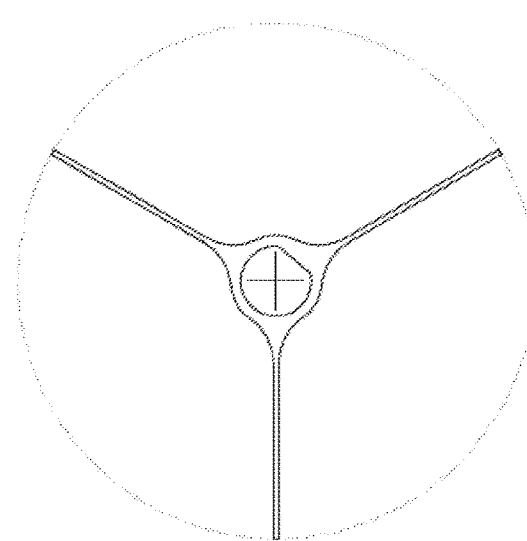
FIG. 22A
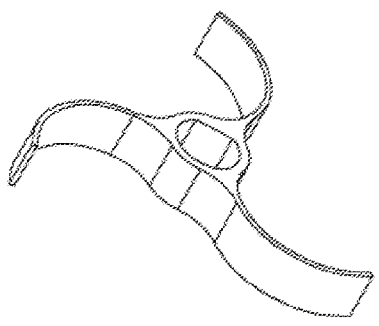
FIG. 22C
FIG. 22

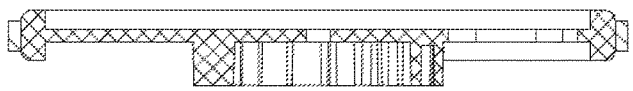
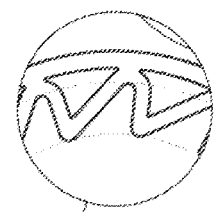
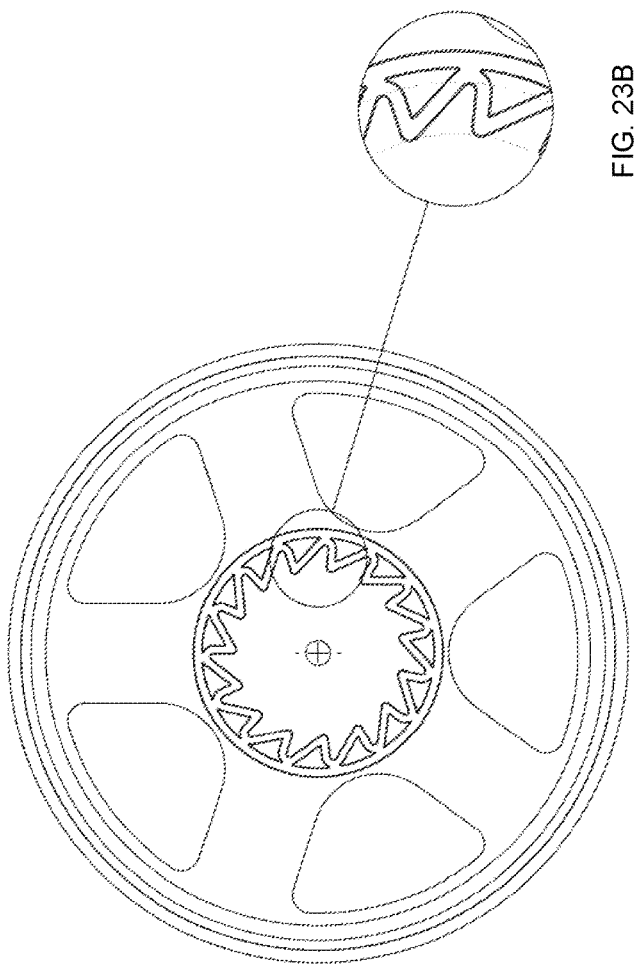
FIG. 23C
FIG. 23B
FIG. 23A
FIG. 23

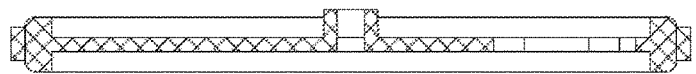
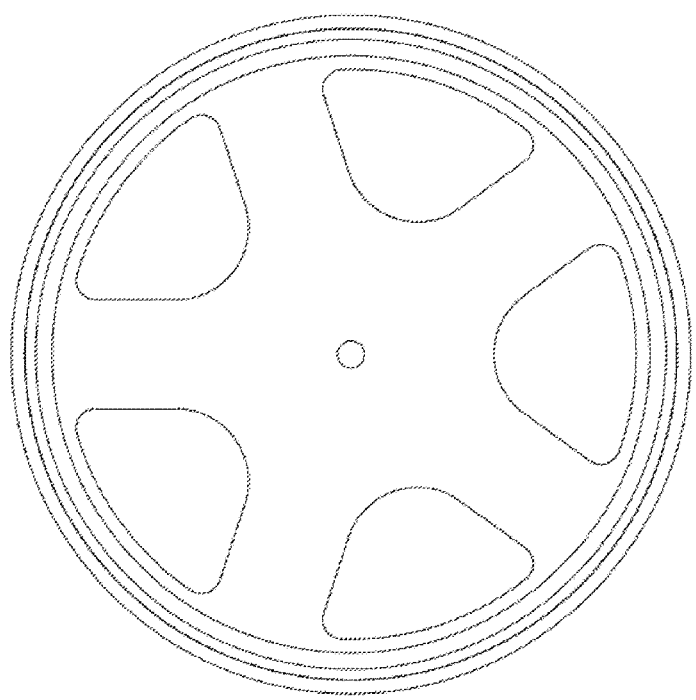
FIG. 24A
FIG. 24B
FIG. 24

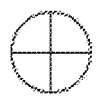
FIG. 25B
FIG. 25A
FIG. 25

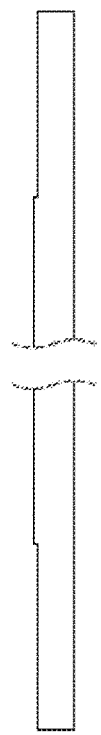
FIG. 26A  FIG. 26B  FIG. 26C
FIG. 26

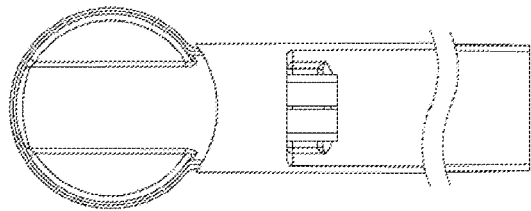
FIG. 29C
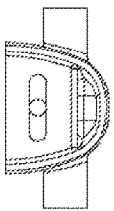
FIG. 29F
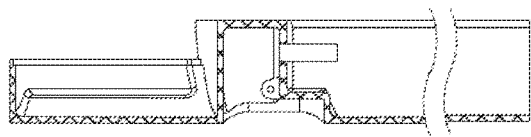
FIG. 29B
FIG. 29
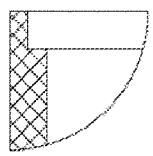
FIG. 29E
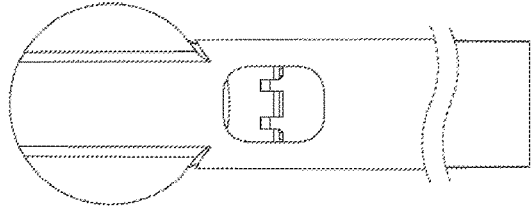
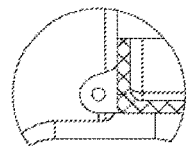
FIG. 29D
FIG. 29A

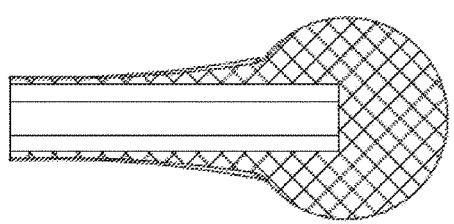
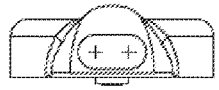
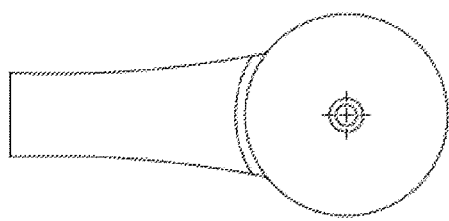
FIG. 30A  FIG. 30C  FIG. 30D  FIG. 30B  FIG. 30

FIG. 31B
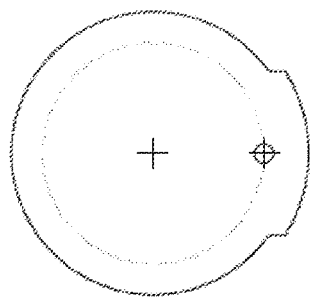
FIG. 31A
FIG. 31

FIG. 32B
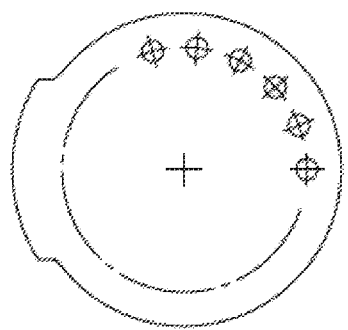
FIG. 32A
FIG. 32

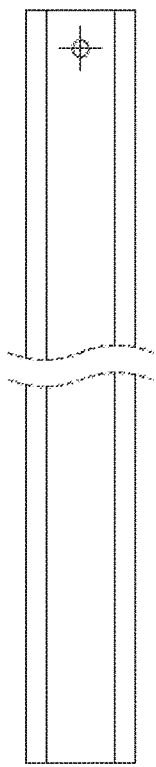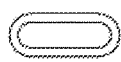
FIG. 33A
FIG. 33B
FIG. 33C
FIG. 33

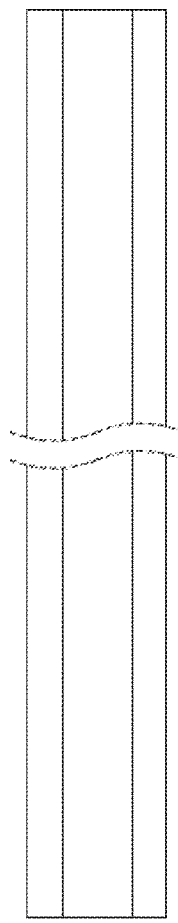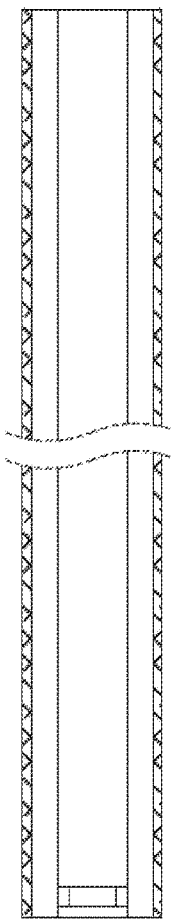
FIG. 34A
FIG. 34B
FIG. 34C
FIG. 34D
FIG. 34

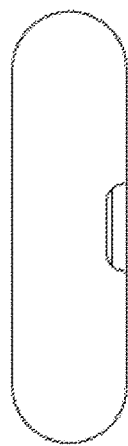
FIG. 35A
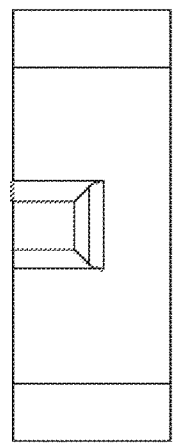
FIG. 35B
FIG. 35

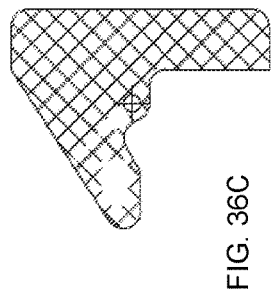
FIG. 36C
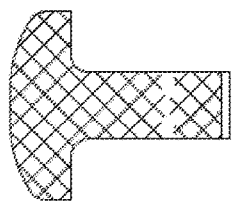
FIG. 36A
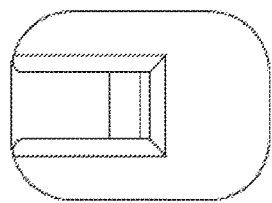
FIG. 36B
FIG. 36

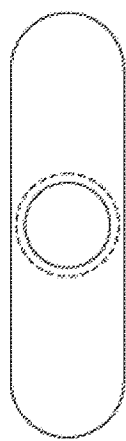
FIG. 37A
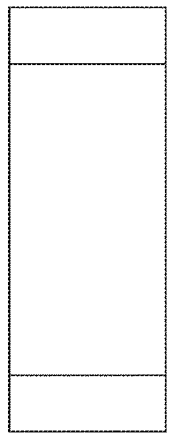
FIG. 37B
FIG. 37

FIG. 38B
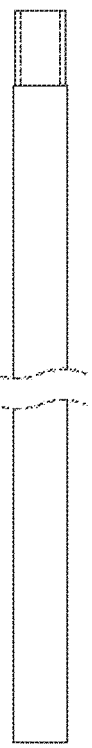
FIG. 38A
FIG. 38

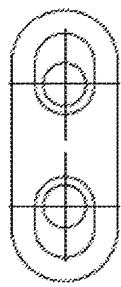
FIG. 39A
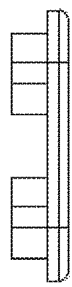
FIG. 39B
FIG. 39

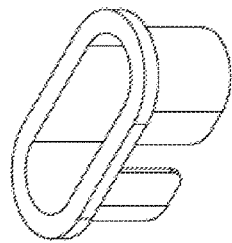
FIG. 40D
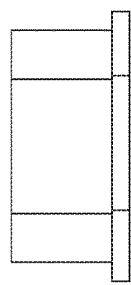
FIG. 40A
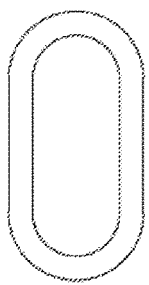
FIG. 40B
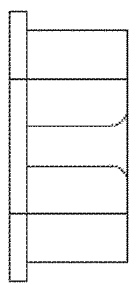
FIG. 40C
FIG. 40

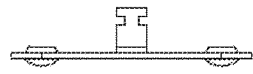
FIG. 41C
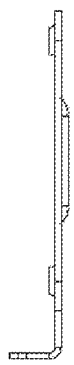
FIG. 41A
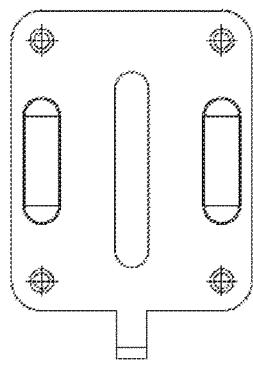
FIG. 41B
FIG. 41

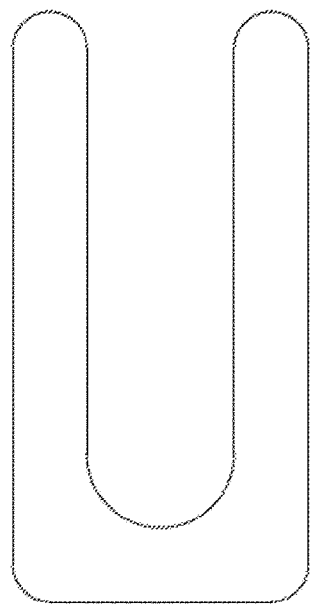
FIG. 42A  FIG. 42B  FIG. 42

FIG. 43A
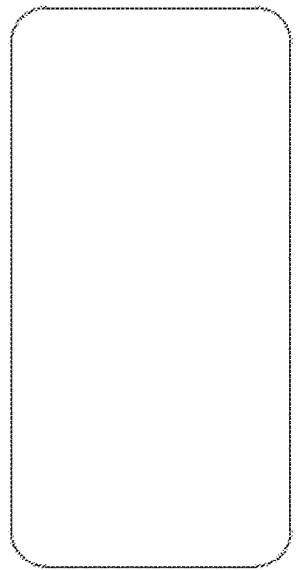
FIG. 43B
FIG. 43

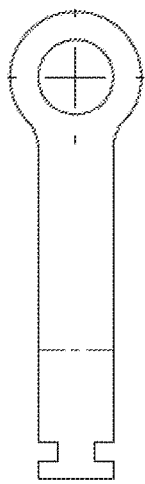
FIG. 44C
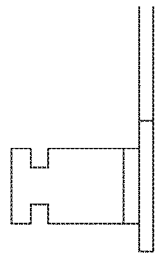
FIG. 44D
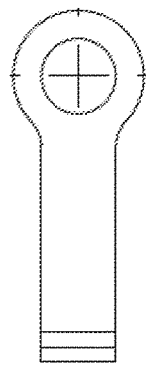
FIG. 44A
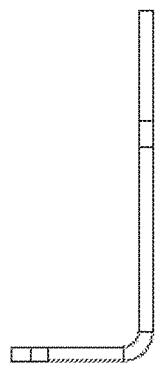
FIG. 44B
FIG. 44

FIG. 45C
FIG. 45B
FIG. 45
FIG. 45A

FIG. 46A
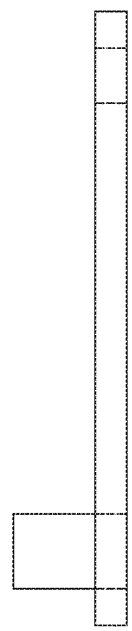
FIG. 46B
FIG. 46

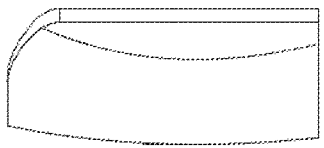
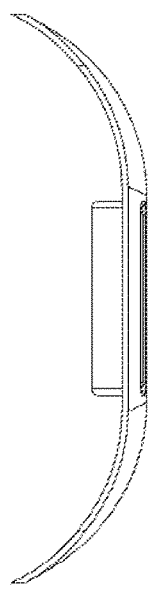
FIG. 47A
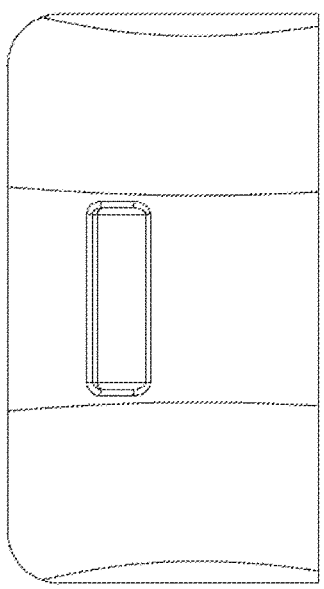
FIG. 47C
FIG. 47D
FIG. 47B
FIG. 47

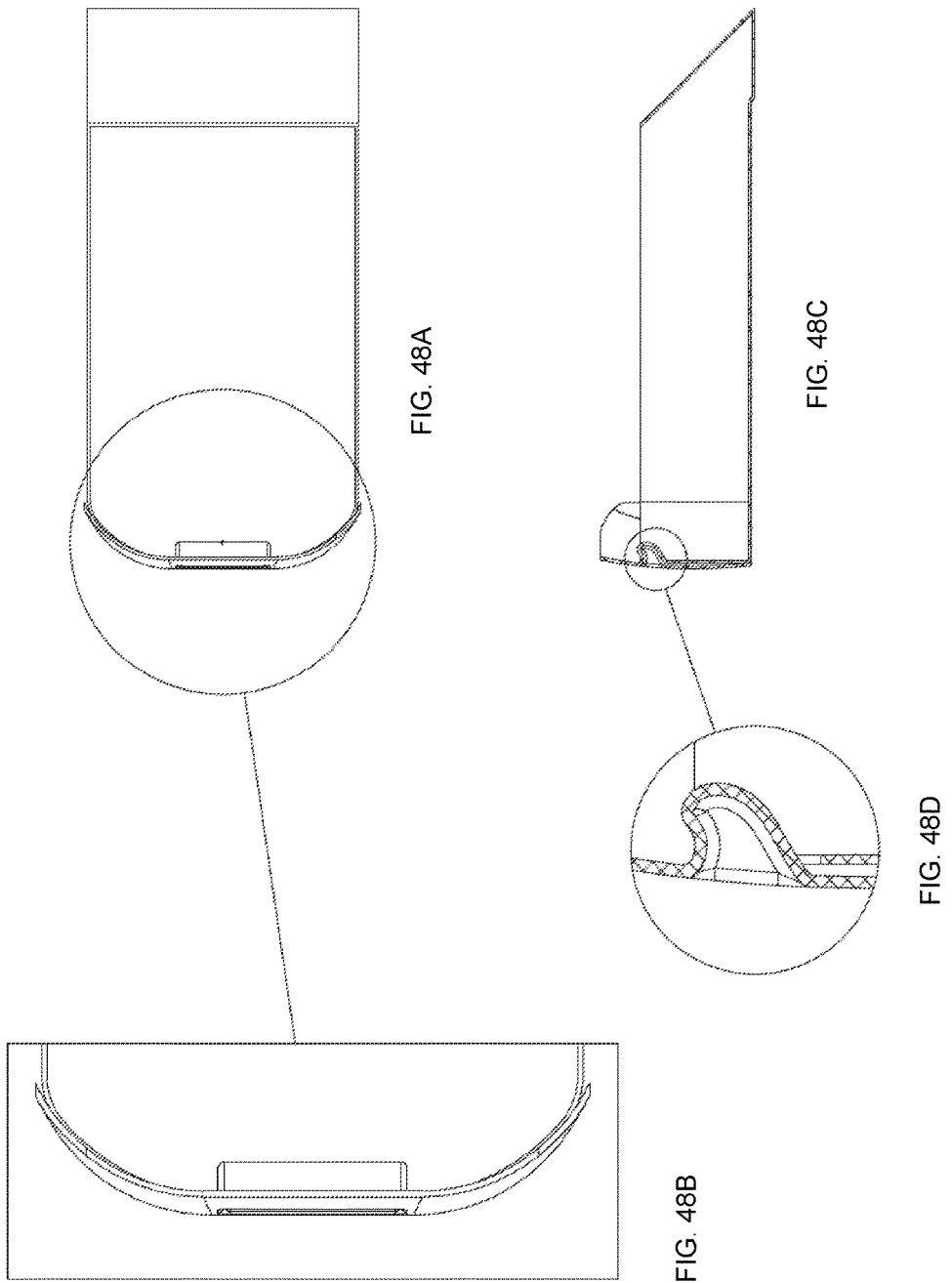

FIG. 49B
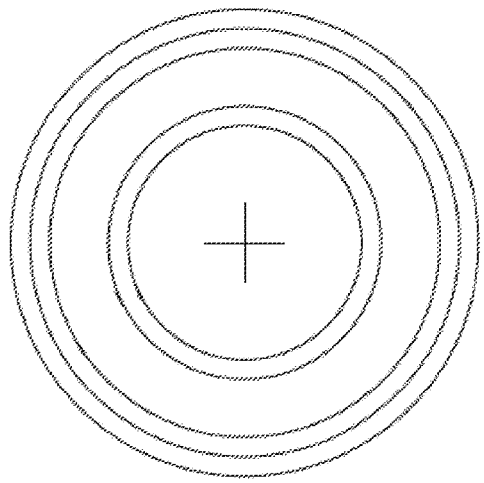
FIG. 49A
FIG. 49

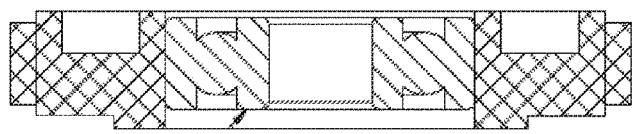
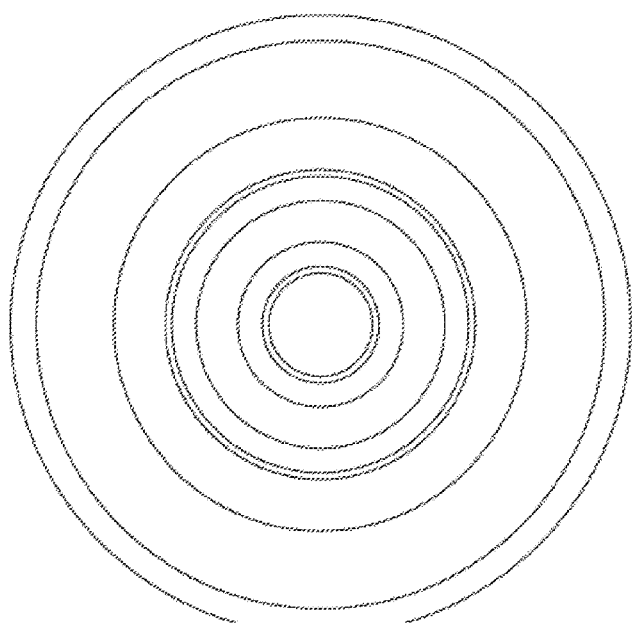
FIG. 50B
FIG. 50A
FIG. 50

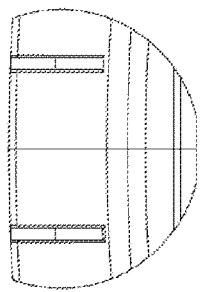
FIG. 51D
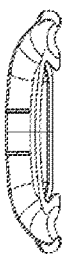
FIG. 51G
FIG. 51C
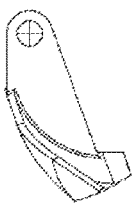
FIG. 51F
FIG. 51B
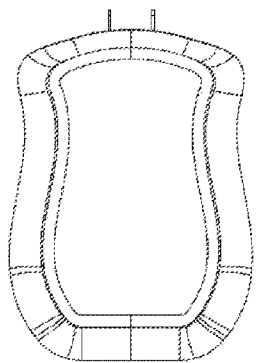
FIG. 51A
FIG. 51E
FIG. 51

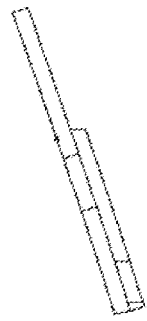
FIG. 52B
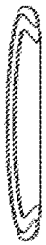
FIG. 52D
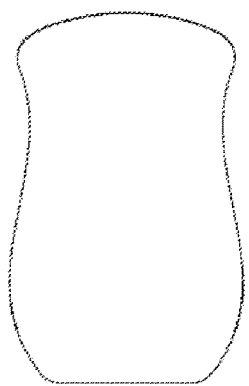
FIG. 52A
FIG. 52C
FIG. 52

RIDE-ON AND PUSH TOY FOR STORAGE AND PICKING UP SMALL OBJECTS ON PLANE SURFACE

BACKGROUND OF THE INVENTION

Field of the Invention

The present subject matter being disclosed by the Inventors relates generally to the field of ride-on and push toys for children, toy storage, and more specifically to a ride-on and push toy to pick up small objects lying on a plane surface.

Description of Related Art

To encourage children to pick up toys or small playing objects scattered on the floor after their playing is not an easy task because children soon feel bored from the repetitively bending down, picking up the toys, going to the storage bin, throwing them into the storage bin, and so on. Especially, when the small objects or toys are tiny, such as blocks, Lego® bricks, small figures, small marbles, or beads, the efforts to pick them up are laborious and tedious.

Although electrical vacuum or floor sweeper is generally used to clean up small litters like dust, pieces of small paper clip, or cookie crumbles on the floor, toys or small playing objects are not suitable to be cleaned up by the electrical vacuum or floor sweeper. The electrical vacuum will often be clogged by the irregular shapes of the toys or the size of the playing small objects larger than the vacuum suction head. Also, the vacuum will suck up dust and the toys into the vacuum at the same time, which will smear the toys with the dust vacuumed. Same issues occur when a floor sweeper is used to pick up the small playing objects or toys on the plane surface.

Therefore, there is a need to help parents or children to save effort in cleaning up the toys or small playing objects lying on the plane surface, like carpet or hardwood floors, while keeping the cleaning up work enjoyable. Also, there is a need to have the cleanup task performed in an efficient way to save time and efforts.

SUMMARY OF THE INVENTION

The subject being disclosed by the Inventors provides a children's ride-on and push toy to pick up small objects lying on a plane surface. The present subject matter being disclosed by the Inventors can be hidden by a child, but also can be turned into a device, like a floor sweeper or manual vacuum, which an adult or a child can push it to pick up small objects lying on the floor or similar plane surface. The present subject matter being disclosed by the Inventors provides a retrievable storage space for temporarily storing the small objects swept into the body of the toy and later emptied to a toy storage bin. The object of the subject being disclosed by the Inventors can be, for example, in an appearance of an animated form, such as an animal, so that the child sitting on it will enjoy the ride and will imagine that the animated animal toy eats up the toys or small playing objects to be cleaned up The present subject matter being disclosed by the Inventors may include a pickup mechanism that can be activated for sweeping or picking up small objects from a plane surface into the storage space of the toy while the toy is used to pick up small objects on a plane surface but it also can be deactivated while the toy is used for the ride-on environment only. One of the embodiments of the sweeping mechanism may include a continuous moving gear-belt system with flexible pick-up pins, or similar suitable impeller that provides sufficient force to sweep the object but flexible enough to pass objects that are too big or too heavy to be swept into the storage space. The appearance of the present subject matter being disclosed by the Inventors can be in animated form, for example, as animals, transportation tools, or cartoon figures to enhance the enjoyment of the riding.

BRIEF DESCRIPTION OF THE SEVERAL VIEWS OF THE DRAWINGS

FIG. 1 shows several views of one of the embodiment of the present subject matter being disclosed by the Inventors. FIG. 1A is a side view of the removable bin; FIG. 1B is a side view of ride on/push toy; FIG 1C is a perspective view of the ride on/push toy.

FIG. 2 shows several views of the ride-on body, for example, in an animated form. FIG. 2A is a top view of the body; FIG. 2B is a left side view of the body; FIG. 2C is a right side view of the body; FIG. 2D is a front side view of the body; and FIG. 2E is a perspective view of the body.

FIG. 7 shows the schematic view of an example of the embodiments of the assembly of the sweeping mechanism of the second sprocket gear, the deactivation button or switch, the friction drive assembly, the ratcheting wheel, and the case. FIG. 7A shows a detailed view of the deactivation switch; and FIG. 7B shows a side view of the deactivation switch.

FIG. 8 shows an example of a schematic view of the telescoping handler. FIG. 8A shows a front side view of the handler; FIG. 8B shows an enlarged view of telescoping mechanism within the handle; and FIG. 8C shows an enlarged view of adjustable joint within the handle.

FIG. 9 shows several views of an example of the embodiments of the toy tray. FIG. 9A shows a top view of the tray; FIG. 9B shows a front side of the tray; and FIG. 9C shows a side view of the tray.

FIG. 10 shows several views of an example of the embodiments of the ride on toy seat. FIG. 10A shows a top view of the seat; FIG. 10B shows a side view of the seat; and FIG. 10C shows a front side of the seat.

FIG. 12 is several views of the case of the sweeping mechanism assembly. FIG. 12A is a left view of the sweeping mechanism assembly; FIG. 12B is a front view of the sweeping mechanism assembly; and FIG. 12C is a detailed side view of the wheel socket.

FIG. 15 shows a couple views of the case of the sweeping mechanism assembly. FIG. 15A is a top view of the case; and FIG. 15B is an enlarged view of the wheel socket of the case.

FIG. 16 shows several views of an example of the embodiments of the axle. FIG. 16A shows a first end of the axle; FIG. 16B shows a side view of the axle; and FIG. 16C shows a second end of the axle.

FIG. 17 shows a couple views of an example of the embodiments of the drum. FIG. 17A shows a side view of the drum; and FIG. 17B shows an end view of the drum.

FIG. 18 shows several views of an example of the embodiments of the drum drive sprocket. FIG. 18A shows a first end of the sprocket; FIG. 18B shows a side view of the sprocket; and FIG. 18C shows a second end of the sprocket.

FIG. 19 shows several views of an example of the embodiments of the friction drive engagement wheel. FIG. 19A shows a first end of the friction drive engagement wheel; FIG. 19B shows a side view of the friction drive engagement wheel; and FIG. 19C shows a second end of the friction drive engagement wheel FIG. 20 shows several views of an example of the embodiments of the friction drive wheel of the ratcheted system. FIG. 20A shows a first end of an assembled ride on toy wheel; FIG. 20B shows a side view of the assembled ride on toy wheel; FIG. 20C shows a second end of an assembled ride on toy wheel; FIG. 20D shows a first end of the ride on toy wheel bearing; and FIG. 20E shows a second end of the ride on toy wheel bearing.

FIG. 21 shows several views of an example of the embodiments of the ratcheted finger of the ratcheted system. FIG. 21A shows a side view of the ratcheted finger of the ratcheted system; FIG. 21B shows a short end view of the ratcheted finger of the ratcheted system; and FIG. 21C shows a top view of the ratcheted finger of the ratcheted system.

FIG. 22 shows several views of an example of the embodiments of the ratcheted finger spring of the ratcheted system. FIG. 22A shows a profile view of the ratcheted finger spring of the ratcheted system; FIG. 22B shows a front view of the ratcheted finger spring of the ratcheted system; and FIG. 22C shows a dimensional view of the ratcheted finger spring of the ratcheted system.

FIG. 23 shows several views of an example of the embodiments of the ratcheting wheel of the ratcheted system. FIG. 23A shows a side view of the ratcheting wheel of the ratcheted system; FIG. 23B shows a detailed view of the center of the ratcheting wheel of the ratcheted system; and FIG. 23C shows a front view of the ratcheting wheel of the ratcheted system.

FIG. 24 shows a couple views of an example of the embodiments of the non-ratchet wheel of the ratcheted system. FIG, 24A shows a front view of the non-ratchet wheel; and FIG. 24B shows a side view of the non-ratchet wheel.

FIG. 25 shows a couple views of an example of the embodiments of the rear wheel axle. FIG. 25A shows a side view of the rear wheel axle; and FIG. 25B shows an end view of the rear wheel axle.

FIG. 26 shows several views of an example of the embodiments of the rear wheel axle. FIG. 26A shows a first end of the rear wheel axle; FIG. 26B shows a side view of the rear wheel axle, and FIG. 26C shows a second end of the rear wheel axle.

FIG. 29 shows several views of an example of the embodiments of the telescoping handle guard of the multiple-position telescoping handler. FIG. 29A shows a first end of the telescoping handle guard of the multiple-position telescoping handler; FIG. 29B shows an interior side view of the telescoping handle guard of the multiple-position telescoping handler; FIG. 29C shows a second end of the telescoping handle guard of the multiple-position telescoping handler; FIG. 29D shows a detailed interior view of the telescoping handle guard of the multiple-position telescoping handler; FIG. 29E shows a detailed view of the joint of the telescoping handle guard of the multiple-position telescoping handler; and FIG. 29F shows a top view of the telescoping handle guard of the multiple-position telescoping handler.

FIG. 30 shows several views of an example of the embodiments of the telescoping handle base of the multiple-position telescoping handler. FIG. 30A shows a top view of the telescoping handle base of the multiple-position telescoping handler; FIG. 30B shows an exterior side of the telescoping handle base of the multiple-position telescoping handler; FIG. 30C shows a face view of the telescoping handle base of the multiple-position telescoping handler; and FIG. 30D shows an interior side view of the telescoping handle base of the multiple-position telescoping handler.

FIG. 31 shows a couple views of an example of the embodiments of the telescoping handle guard rotation cover of the multiple-position telescoping handler. FIG. 31A shows an exterior side view of the telescoping handle guard rotation cover of the multiple-position telescoping handler; and FIG. 31B shows a face view of the telescoping handle guard rotation cover of the multiple-position telescoping handler.

FIG. 32 shows a couple views of an example of the embodiments of the telescoping handle grip rotation cover of the multiple-position telescoping handler. FIG. 32A shows an interior side view of the telescoping handle guard rotation cover of the multiple-position telescoping handler; and FIG. 32B shows a face view of the telescoping handle guard rotation cover of the multiple-position telescoping handler.

FIG. 33 shows several views of an example of the embodiments of the wall inner telescope tube of the multiple-position telescoping handler. FIG. 33A shows a face view of the wall inner telescope tube of the multiple-position telescoping handler; FIG. 33B shows a side view of the wall inner telescope tube of the multiple-position telescoping handler; and FIG. 33C shows a top view of the wall inner telescope tube of the multiple-position telescoping handler.

FIG. 34 shows several views of an example of the embodiments of the wall inner telescope tube of the multiple-positron telescoping handler. FIG. 34A shows an exterior side of the wall inner telescope tube of the multiple-position telescoping handler; FIG. 34B shows a face view of the wall inner telescope tube of the multiple-position telescoping handler; FIG. 34C shows an interior side of the wall inner telescope tube of the multiple-position telescoping handler; and FIG. 34D shows a top view of the wall inner telescope tube of the multiple-position telescoping handler.

FIG. 35 shows a couple views of an example of the embodiments of the wall telescoping handle lock of the multiple-position telescoping handler. FIG. 35A shows a top view of the wall telescoping handle lock of the multiple-position telescoping handler; and FIG. 35B shows a side view thereof.

FIG. 36 shows several views of an example of the embodiments of the telescoping handle lock release button or switch of the multiple-position telescoping handler. FIG. 36A shows a side of the telescoping handle lock release button or switch of the multiple-position telescoping handler; FIG. 36B shows a top view of the telescoping handle lock release button or switch of the multiple-position telescoping handler; and FIG. 36C shows a face view of the telescoping handle lock release button or switch of the multiple-position telescoping handler.

FIG. 37 shows a couple views of an example of the embodiments of the telescoping handle push rod block of the multiple-position telescoping handler. FIG. 37A shows a top view of the telescoping handle push rod block of the multiple-position telescoping handler; and FIG. 37B shows a side of the telescoping handle push rod block of the multiple-position telescoping handler.

FIG. 38 shows a couple views of an example of the embodiments of the telescoping handle lock push rod of the multiple-position telescoping handler. FIG. 38A shows a side of the telescoping handle lock push rod of the multiple-position telescoping handler; and FIG. 38B shows a top view of the telescoping handle lock push rod of the multiple-position telescoping handler.

FIG. 39 shows a couple views of an example of the embodiments of the telescoping handle lock of the multiple-position telescoping handler. FIG. 39A shows a top view of the telescoping handle lock of the multiple-position telescoping handler; and FIG. 39B shows a side view of the telescoping handle lock of the multiple-position telescoping handler.

FIG. 40 shows several views of an example of the embodiments of the telescoping handle tube spacer of the multiple-position telescoping handler. FIG. 40A shows a first side of the telescoping handle tube spacer of the multiple-position telescoping handler; FIG. 40B shows a top view of the telescoping handle tube spacer of the multiple-position telescoping handler; FIG. 40C shows a second side of the telescoping handler tube spacer of the multiple-position telescoping handler; and FIG. 40D shows a dimensional view of the telescoping handle tube spacer of the multiple-position telescoping handler.

FIG. 41 shows several views of an example of the embodiments of the friction drive lock plate base of the friction drive assembly. FIG. 41A shows a profile of the friction drive lock plate base of the friction drive assembly; FIG. 41B shows a side of the friction drive lock plate base of the friction drive assembly; and FIG. 41C shows a face view of the friction drive lock plate base of the friction drive assembly.

FIG. 42 shows a couple views of an example of the embodiments of the friction drive lock plate spacer of the friction drive assembly. FIG. 42A shows a profile of the friction drive lock plate spacer of the friction drive assembly; and FIG. 42B shows a top view of the friction drive lock plate spacer of the friction drive assembly.

FIG. 43 shows a couple views of an example of the embodiments of the friction drive lock plate back of the friction drive assembly. FIG. 43A shows a profile view of the friction drive lock plate back of the friction drive assembly; and FIG. 43B shows a top view of the friction drive lock plate back of the friction drive assembly.

FIG. 44 shows several views of an example of the embodiments of the friction drive lock spring post of the friction drive assembly. FIG. 44A shows a depressed side of the friction drive lock spring post of the friction drive assembly; FIG. 44B shows a face view of the friction drive lock spring post of the friction drive assembly; FIG. 44C shows an extended side view of the friction drive lock spring post of the friction drive assembly; and FIG. 44D shows a profile view of the friction drive lock spring post of the friction drive assembly.

FIG. 45 shows several views of an example of the embodiments of the friction drive lock handle spacer of the friction drive assembly. FIG. 45A shows a top view of the friction drive lock handle spacer of the friction drive assembly; FIG. 45B shows a profile view of the friction drive lock handle spacer of the friction drive assembly; and FIG. 45C shows a button view of the friction drive lock handle spacer of the friction drive assembly.

FIG. 46 shows a couple views of an example of the embodiments of the friction drive lock handle of the friction drive assembly. FIG. 46A shows a top view of the friction drive lock handle of the friction drive assembly; and FIG. 46B shows a profile view of the friction drive lock handle of the friction drive assembly.

FIG. 47 shows several views of an example of the embodiments of the ride on toy bin back skin. FIG. 47A shows a top view of the ride on toy bin back skin; FIG. 47B shows a detailed interior profile view of the ride on toy bin back skin, FIG. 47C shows a back view of the ride on toy bin back skin; and FIG. 47D shows an exterior side of the ride on toy bin back skin.

FIG. 48 shows several views of an example of the embodiments of the ride on toy tray assembly. FIG. 48A shows a complete top view of the ride on toy tray; FIG. 48B shows a detailed top view of the back of the ride on toy tray assembly; FIG. 48C shows a complete side of the ride on toy tray assembly; and FIG. 48D shows a detailed side view of the recessed handle of the ride on toy tray assembly.

FIG. 49 shows a couple views of an example of the embodiments of the friction drive idler wheel. FIG. 49A shows a side of the friction drive idler wheel; and FIG. 49B shows a face view of the friction drive idler wheel.

FIG. 50 shows a couple views of an example of the embodiments of the friction drive idler wheel assembly. FIG. 50A shows a side of the friction drive idler wheel assembly; and FIG. 50B shows a face view of the friction drive idler wheel assembly.

FIG. 51 shows several views of an example of the embodiments of the ride on toy seat. FIG. 51A shows a top view of the complete ride on toy seat; FIG. 51B shows a face view of the ride on toy seat; FIG. 51C shows a detailed view of the ride on toy seat; FIG. 51D shows a detailed view of the seat bracket face; FIG. 51E shows a profile view of the ride on toy seat; FIG. 51F shows a detailed side view of the ride on toy seat bracket; and FIG. 51G shows a front view of the ride on toy seat.

FIG. 52 shows several views of an example of the embodiments of the ride on toy seat. FIG. 52A shows a top view of the ride on toy seat center, FIG. 52B shows a structural segment of the ride on toy seat center; FIG. 52C shows a profile view of the ride on toy seat center; and FIG. 52D shows a front face view of the ride on toy seat center.

DETAILED DESCRIPTION OF PREFERRED EMBODIMENT

Figure 3:
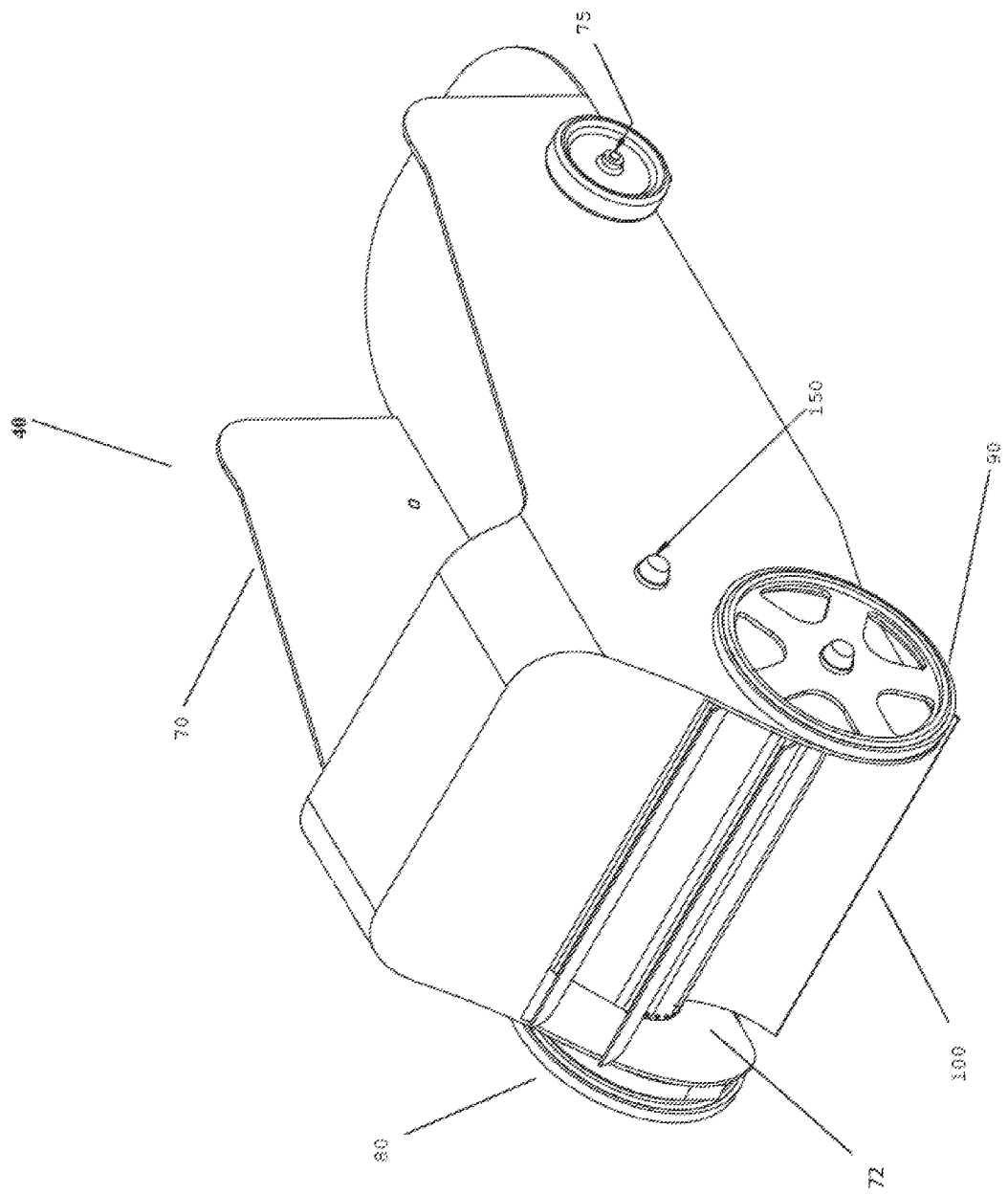
FIG. 3 is a perspective view of one of the embodiment of the mechanical structure of the sweeping mechanism when it is assembled with front wheels, a deactivation button or switch, the faction driving wheels, the pickup fins.

The present subject matter being disclosed by the Inventors relates to a children's ride-on and push toy as an example shown in FIG. 1 It may also function as sweeping device such as a floor sweeper or manual vacuum to pick up small objects lying on a plane surface. In FIG. 1, the embodiment of the present subject matter being disclosed by the Inventors may include a ride-on body 10 with a seat 20 on which a child can ride, a multiple-position telescoping handle 30, which may be switched and/or extended for a person to push or pull the ride-on toy; footrests 60 for the rider's feet; a sweeping mechanical assembly 40 to pick up toys and small objects, and a toy tray 300 to store the picked up small objects 30. The mechanical structure of sweeping assembly 40 is located under the ride-on body 10. In FIG. 3, for example, the mechanical structure of sweeping assembly 40 may further include a friction drive wheel 80, a friction non-drive wheel 90, a plurality of pickup fins 100, a deactivation button or switch or switch 150, a case 70, and a front wheel 75.

The ride-on body 10 may be in an animated form, such as animal form, vehicular form, vessel form, aircraft form, cartoon figures, or other form that enhances the enjoyment of riding FIG. 2 shows one of the embodiments of the present subject matter being disclosed by the Inventors in an animated form. The ride-on body 10 has an opening 15 underneath the head portion 12 of the ride-on body (see the example in FIG. 2). In FIG. 3, for example, the opening 15 (not shown) of the ride-on body 10 (not shown) is aligned with the opening 72 for the pickup fins 100 of the sweeping mechanical assembly 40.

Figure 4:
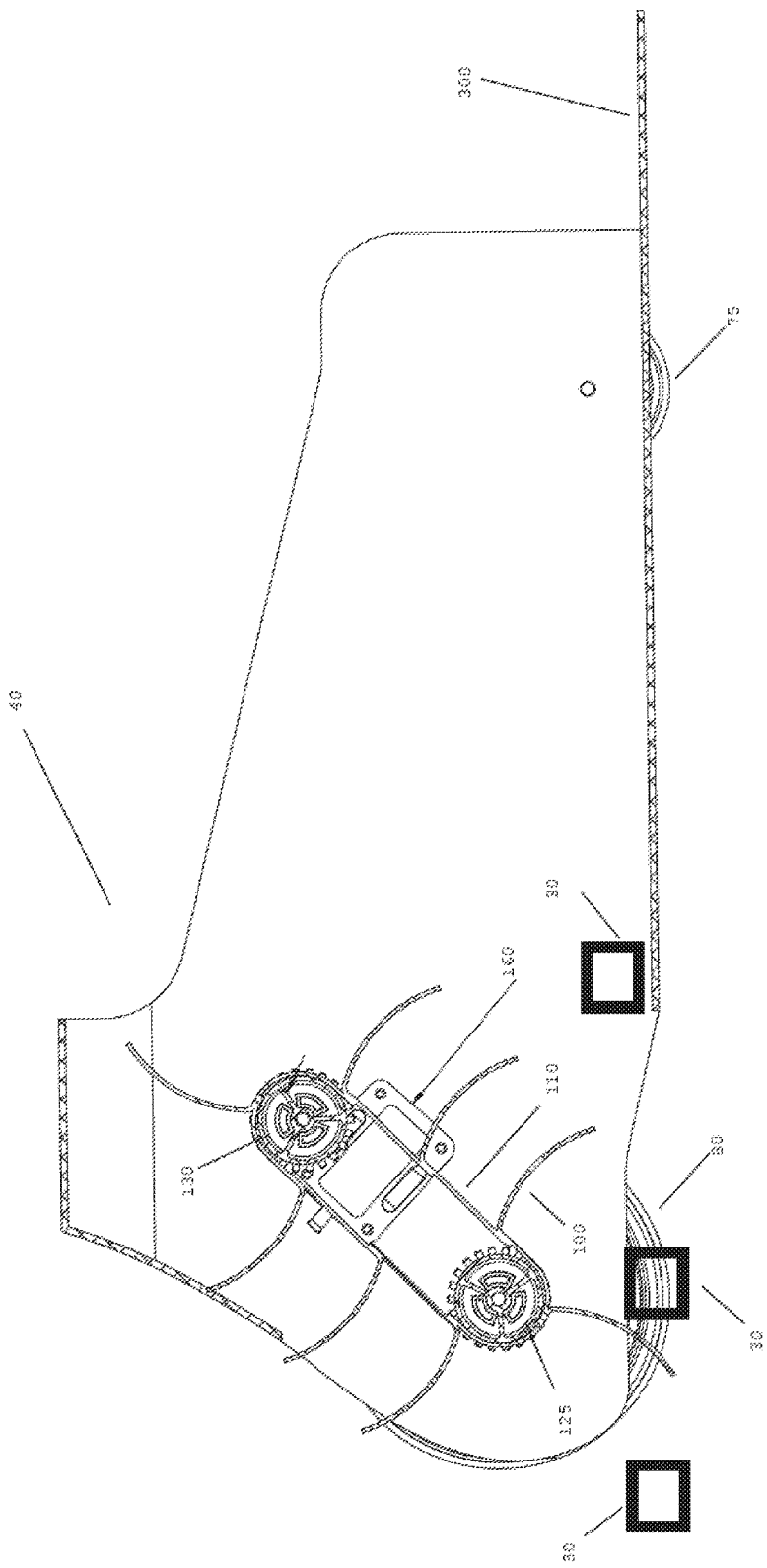
FIG. 4 shows of the schematic view of an example of the embodiments of the sweeping mechanism that may include the case, the gear sets, and the friction drive assembly, the belt, and the pickup fins.

As seen in FIG. 4, the sweeping mechanical assembly 40 of the embodiment of the present subject matter being disclosed by the Inventors may include a belt 110, pickup fins 100 vertically attached or affixed on the outer surface of the belt 110 as the sweeping paddlers or impeller, a first sprocket gear 125, and a second sprocket gear 130. In one embodiment, the first sprocket gear 125 is connected to the toy's ratcheting wheel 80 and the non-ratchet wheel 90 (not shown). The second sprocket gear 130 may be separated in a distance from the first sprocket gear 125. The belt 110 is stretched between those two sprocket gears. One end of the belt contacts with first sprocket gear 125. The other end of the belt 110 contacts with the second sprocket gear 130.

Figure 5:
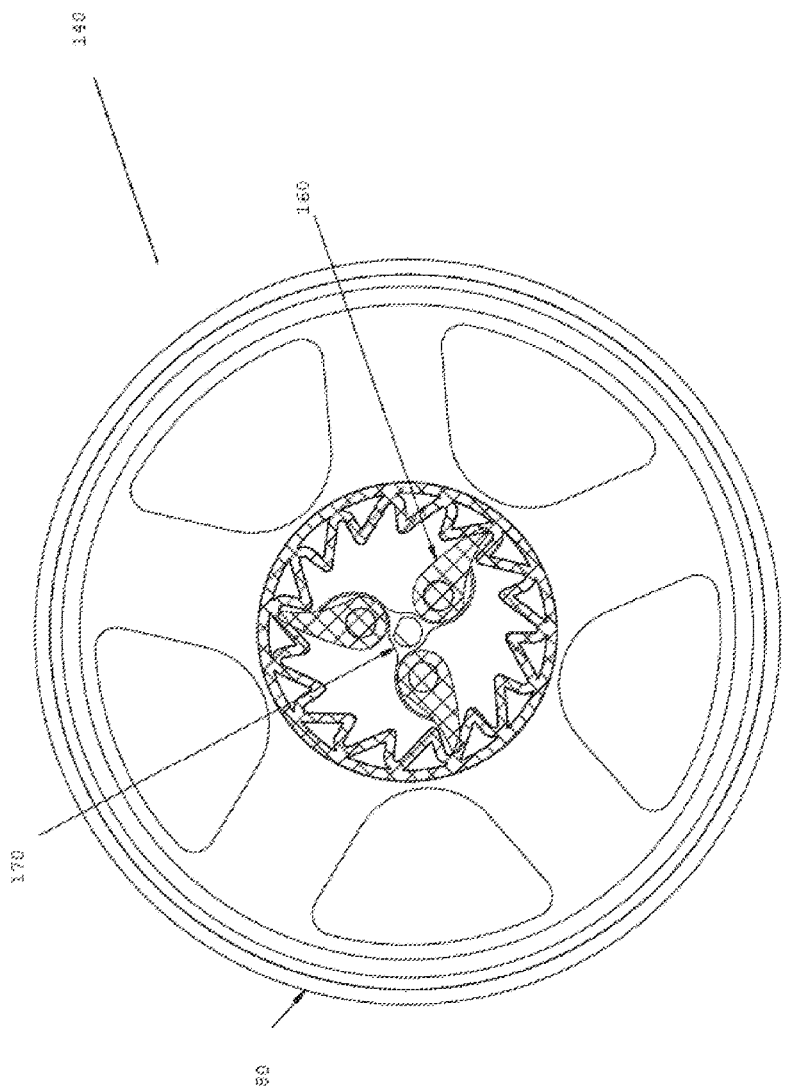
FIG. 5 shows the schematic view of an example of the embodiments of the ratchet system
Figure 6:
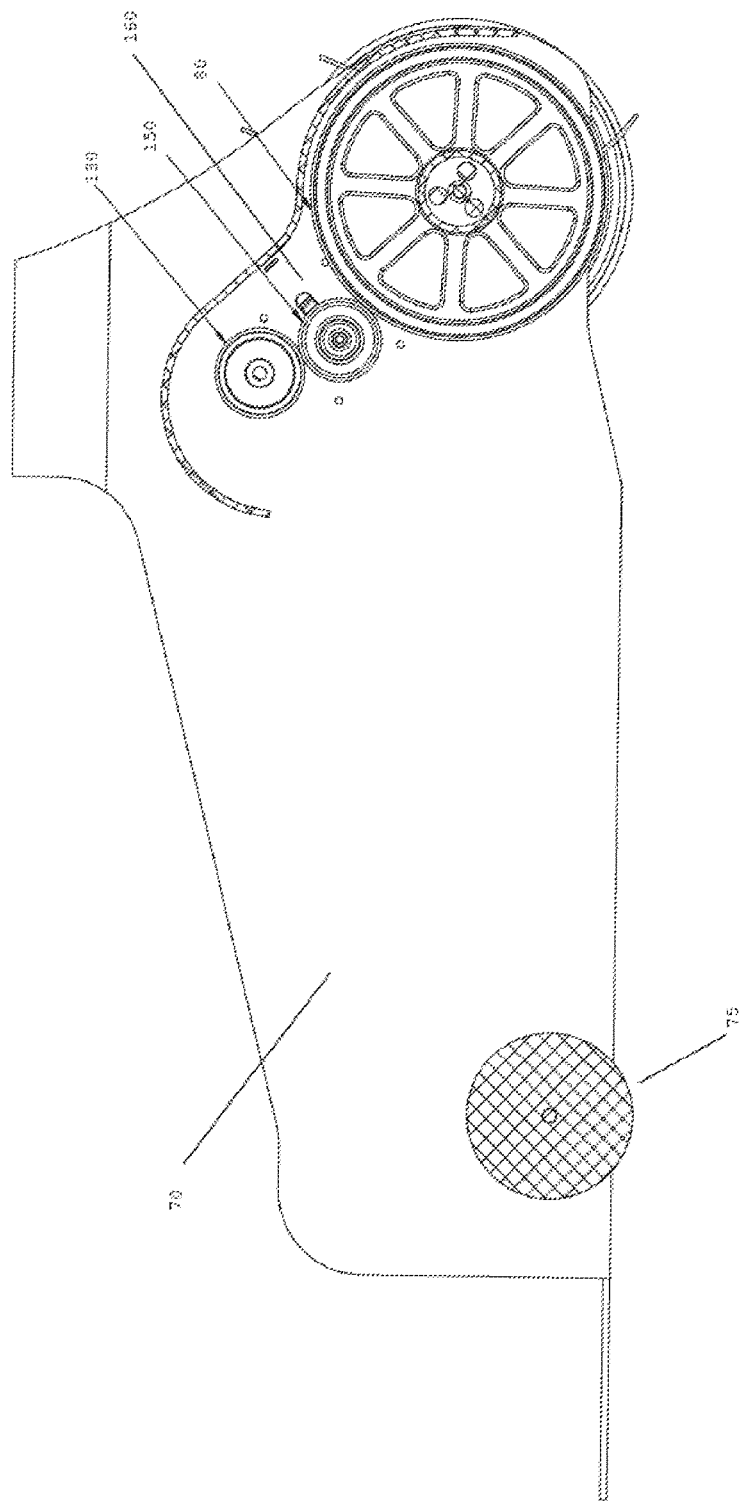
FIG. 6 is a perspective view of one of the embodiment of the friction drive assembly.
Figure 11:
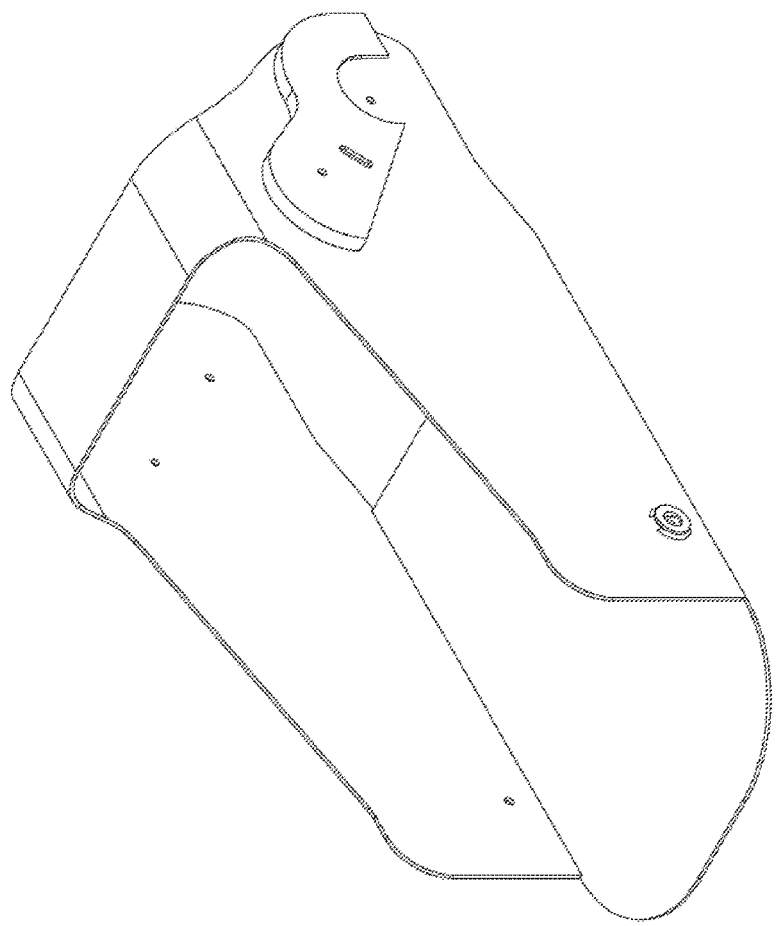
FIG. 11 shows the schematic view of an example of the embodiments of the case of the sweeping mechanism assembly
Figure 13:
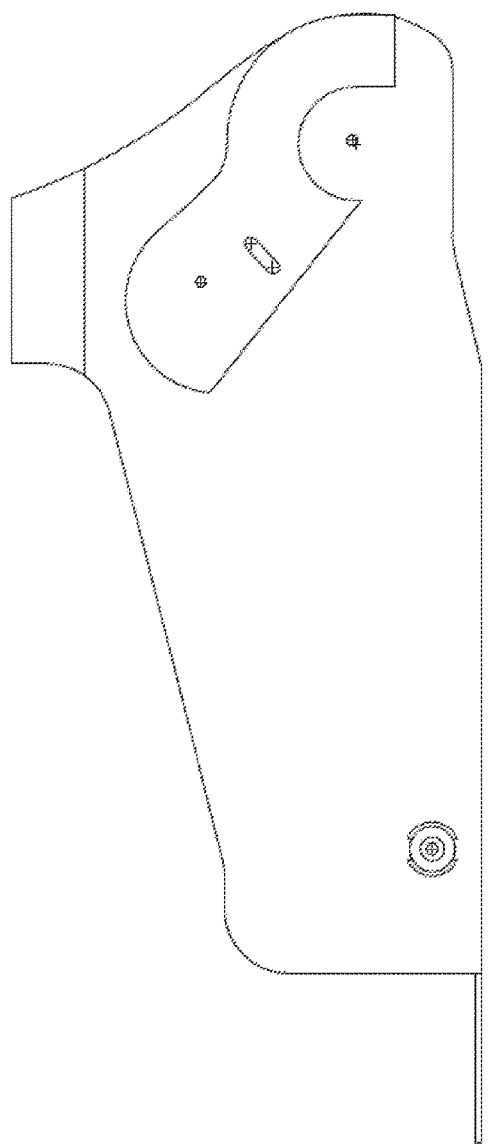
FIG. 13 is a schematic, right view of the case of the sweeping mechanism assembly.
Figure 14:
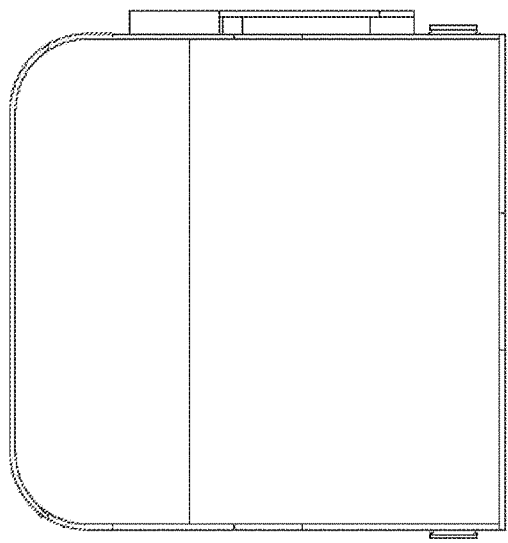
FIG. 14 is a schematic, front view of the case of the sweeping mechanism assembly.
Figure 27:
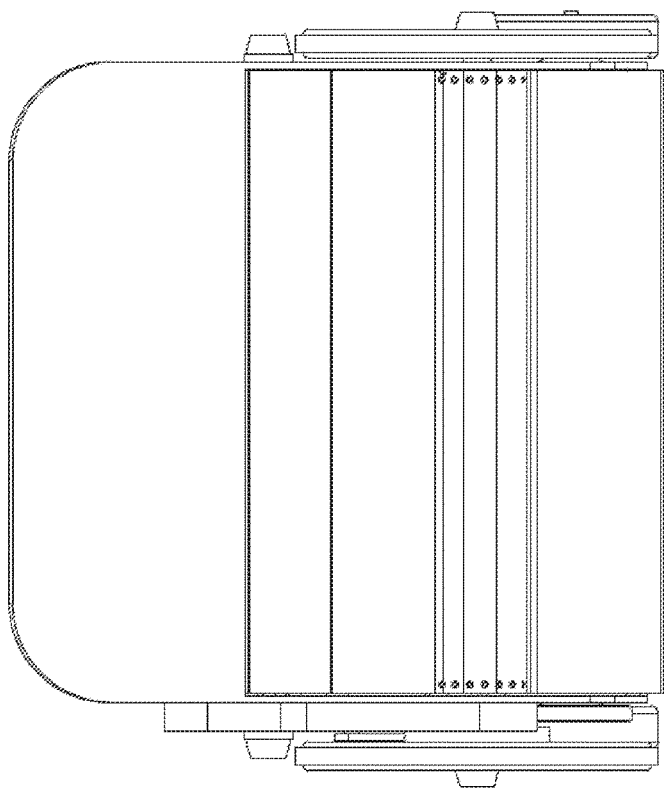
FIG. 27 is a schematic rear view of the sweeping mechanical assembly.
Figure 28C:
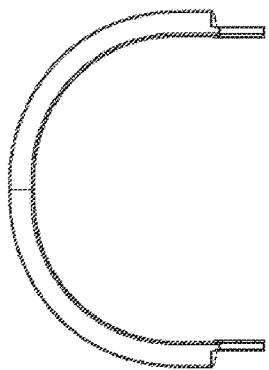
FIG. 28C shows a second end of the telescoping handle grip of the multiple-position telescoping handle.
Figure 28F:
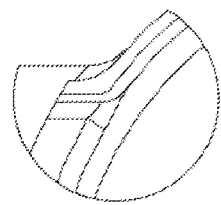
FIG. 28F shows another view of the telescoping handle grip of the multiple-position telescoping handle.
Figure 28B:
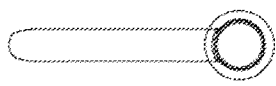
FIG. 28B shows a profile view of the top of the telescoping handle grip of the multiple-position telescoping handle.
Figure 28E:
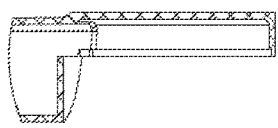
FIG. 28E shows an interior view of the telescoping handle grip of the multiple-position telescoping handle.
Figure 28:
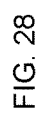
FIG. 28 shows several views of an example of the embodiments of the telescoping handle grip of the multiple-position telescoping handle.
Figure 28A:
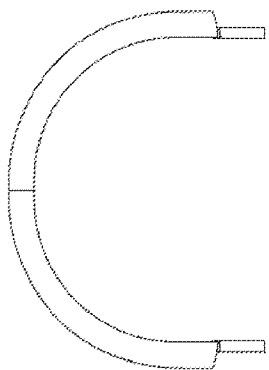
FIG. 28A shows the first end of the telescoping handle grip of the multiple-position telescoping handle.
Figure 28D:
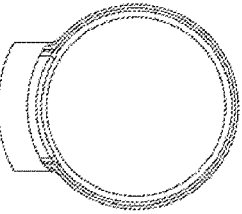
FIG. 28D shows a detailed view of the rotating joint of the top of the telescoping handle grip of the multiple-position telescoping handle.

When the toy moves forward as the head portion of the ride-on body 10 is in the front, its ratcheting wheel 80 and non-ratchet wheel 90 drive the first sprocket gear 125, and then the first sprocket gear further drives the belt 110 to move. By this way, the pickup fins 100 on the outer surface of the belt 110 will continuously and rapidly move forward to sweep small objects 30 on the plane surface into the toy tray 300. The pickup fins 100 may be made of plastic material that is resilient and flexible to bend but has sufficient strength to push or sweep small objects when the pickup pins 100 are in contact with small objects on the plane surface. One embodiment of the pickup fins is made of vinyl polymer. The number of pickup fins is at least two In one of the embodiment, the sweeping mechanism is controlled by a ratchet system 140 (as the example seen in FIG. 5) that limits the movement direction of the belt in the forward direction when the embodiment of the present subject matter being disclosed by the Inventors works as a sweeper to pick up small objects from the plane surface, and a deactivation button or switch 150 (as the example seen in FIG. 6) to deactivate the ratchet system when the embodiment of the present subject matter being disclosed by the Inventors is used as a ride-on toy only In FIG. 4, for example, the ratchet system 140 may include a ratcheted finger 160, ratcheted finger spring 170, and a ratcheting wheel 80 as seen in FIG. 5 The deactivation button or switch 150 is connected to a friction drive mechanical assembly 160 and the friction drive mechanical assembly 140 is further connected to the belt 110 (as the example shown in FIG. 4).

The friction drive mechanical assembly further comprises a friction drive lock plate base 180, friction drive lock plate spacer 190, friction drive lock plate back 200, friction drive lock spring post 210, friction drive lock handle 220, friction drive lock handle space 230, and shoulder 240 (as the example seen in FIG. 7).

In FIG. 8, for example, the ride-on toy body 10 may include a multiple-position telescoping handle 30, which can be switched and/or extended for a person to push or pull the ride-on toy. In one of the embodiment, the multiple-position telescoping handle 30 may further include telescoping handle grip 310, telescoping handle guard 320, telescoping handle guard rotation cover 330, telescoping handle grip rotation cover 340, telescoping handle base 350, wall inner telescope tube 360, wall inner telescope tribe 370, telescoping handle tube spacer 380, telescoping handle lock spring plate 390, telescoping handle lock 400, telescoping handle push rod block 410, telescoping handle lock release button or switch 420, telescoping handle lock push rod 430, bearing ball 440, and compression spring 450.

The multiple-position telescoping handle 30 may be connected to the ride-on body 10 by the telescoping handle base 350 (as the example seen in FIG. 1). The telescoping handle 30 may be pivoted around the telescoping handle base 350. The telescoping handle 30 can also move down and up along the wall inner telescope tube 360 and the wall inner telescope tube 407 The telescoping handle grip 401 can also pivot up and down around the telescoping handle guard 320 (as the example seen in FIG. 8).

It is to be understood that the present subject matter being disclosed by the Inventors is not limited to the embodiment above but encompasses any and all embodiments within the scope of the claims in the provisional application to be filed later. The dimensions, if any, shown in the figures are to give an example of the embodiment, but not to limit the disclosed subject matter to be claimed.

The invention claimed is:

1. A ride-on toy that is configured to be ridden by a child and pick up small toys from a floor surface that comprises a body that is configured to support the child and a plurality of rotating wheels located on a bottom side of the body, wherein the ride-on toy further comprises:
    (a) a sweeping assembly located on the bottom side of the body that includes a belt and mechanical gear system that is configured to deliver the small toys into a container housed within the body, wherein the belt is configured to be rotated by the mechanical gear system in response to the wheels of the ride-on toy rotating forward,
    (b) a telescoping handle that is configured to be manually converted into at least three different positions, wherein:
        (i) a first position is configured to enable the child to ride the ride-on toy without assistance, (ii) a second position is configured to enable the child to ride the ride-on toy while being pushed by another person, and
(iii) a third position is configured to enable the child or another person to push the ride-on toy without a rider,
(c) a switch that is configured to enable or disable the sweeping assembly,
(d) a ratchet system that is configured to prevent the belt from rotating in an opposite direction which could discard collected small toys out of the container of the ride-on toy,
(e) a plurality of flexible vinyl fins connected to the belt of the sweeping assembly that are configured to rotate along with the belt and grip the small toys,
(f) a clear seat located on a top side of the body that is configured to (i) allow the child to visually observe deliverance of the small toys into the container and (ii) open to allow retrieval of the small toys from the container, and
(g) a removable drawer that is configured to allow retrieval of the small toys from the container.

* * * * *